(12) United States Patent
Wu

(10) Patent No.: US 11,341,478 B2
(45) Date of Patent: May 24, 2022

(54) PAYMENT PROCESSING METHOD AND APPARATUS, AND INTELLIGENT DEVICE

(71) Applicant: TENCENT TECHNOLOGY (SHENZHEN) COMPANY LIMITED, Shenzhen (CN)

(72) Inventor: Dongfang Wu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 525 days.

(21) Appl. No.: 16/041,306

(22) Filed: Jul. 20, 2018

(65) Prior Publication Data

US 2018/0330362 A1  Nov. 15, 2018

Related U.S. Application Data

(63) Continuation of application No. PCT/CN2016/109464, filed on Dec. 12, 2016.

(30) Foreign Application Priority Data

Feb. 4, 2016  (CN) .......................... 201610079780.2

(51) Int. Cl.
*G06Q 20/32* (2012.01)
*G06Q 50/00* (2012.01)
(Continued)

(52) U.S. Cl.
CPC ..... *G06Q 20/3274* (2013.01); *G06F 9/44526* (2013.01); *G06K 19/06028* (2013.01);
(Continued)

(58) Field of Classification Search
CPC ............ G06Q 20/3274; G06Q 20/386; G06Q 20/3276; G06Q 50/01; G06K 19/06037;
(Continued)

(56) References Cited

U.S. PATENT DOCUMENTS

| 5,944,784 A | * | 8/1999 | Simonoff ................ G06F 9/545 709/202 |
| 6,149,059 A | * | 11/2000 | Ackley .................. G06K 1/121 235/462.01 |
| 2010/0311397 A1 | | 12/2010 | Li | |

FOREIGN PATENT DOCUMENTS

| CN | 102842081 A | 12/2012 |
| CN | 102915604 A | 2/2013 |

(Continued)

OTHER PUBLICATIONS

Dialog NPL (non-patent literature) Search, dated Feb. 11, 2022. (Year: 2022).*

(Continued)

*Primary Examiner* — Hai Tran
(74) *Attorney, Agent, or Firm* — Anova Law Group, PLLC

(57) ABSTRACT

A payment processing method and method and an intelligent device are provided. The method may include: intercepting a payment request in a target application program (application, APP) in the intelligent device, the payment request including a payment parameter; obtaining attribute information of the target application program by using a preset executable file; generating a graphic code according to the payment request; outputting the graphic code, so that a terminal device submits the payment parameter to a payment server by scanning the graphic code and reports account information to the payment server, and the payment server performs payment processing according to the payment parameter and the account information and returns a payment result; and feeding back the payment result to the target application program according to the attribute information of the target application program. The method can simplify a payment process and improve the payment efficiency.

18 Claims, 3 Drawing Sheets

(51) Int. Cl.
*G06K 19/06* (2006.01)
*G06F 9/445* (2018.01)
*G06F 8/41* (2018.01)

(52) U.S. Cl.
CPC ... *G06K 19/06037* (2013.01); *G06Q 20/3276* (2013.01); *G06Q 50/01* (2013.01); *G06F 8/44* (2013.01)

(58) Field of Classification Search
CPC .. G06K 19/06028; G06F 9/44526; G06F 8/44
USPC .......................................................... 705/41
See application file for complete search history.

(56) References Cited

FOREIGN PATENT DOCUMENTS

| | | | |
|---|---|---|---|
| CN | 103295127 | A | 9/2013 |
| CN | 103426083 | A | 12/2013 |
| CN | 105046482 | A | 11/2015 |
| CN | 105678540 | A | 6/2016 |
| JP | 2012529699 | A | 11/2012 |
| KR | 20120013294 | A | 2/2012 |
| KR | 20120045622 | A | 5/2012 |
| KR | 20140023144 | A | 2/2014 |
| WO | 2014032549 | A1 | 3/2014 |

OTHER PUBLICATIONS

Google NPL (non-patent literature) Search, dated Feb. 11, 2022. (Year: 2022).*
The World Intellectual Property Organization (WIPO) International Search Report for PCT/CN2016/109464 dated Mar. 15, 2017 6 Pages (including translation).
The State Intellectual Property Office of the People's Republic of China (SIPO) Office Action 1 for 201610079780.2 dated Jan. 4, 2018 7 Pages (including translation).
The State Intellectual Property Office of the People's Republic of China (SIPO) Office Action 3 for 201610079780.2 dated Apr. 7, 2020 8 Pages (including translation).
Korean Intellectual Property Office (KIPO) Office Action 2 for 10-2018-7020994 dated May 26, 2020 9 Pages (including translation).
Web blog, "Learn about the benefits of a Hyundai App Card event to pay online payments in one shot," Mar. 2, 2014, Retrieved from the Internet <URL: https://myung123.tistory.com/239>, [retrieved on Jun. 11, 2020], the whole document 12 Pages (including translation).
Korean Intellectual Property Office (KIPO) Office Action 1 for 10-2018-7020994 dated Jan. 14, 2022 9 Pages (including translation).
Korean Intellectual Property Office (KIPO) Office Action 1 for 20187020994 dated Nov. 19, 2019 10 Pages (including translation).

* cited by examiner

PAYMENT PROCESSING METHOD AND APPARATUS, AND INTELLIGENT DEVICE

RELATED APPLICATION

This application is a continuation application of PCT Patent Application No. PCT/CN2016/109464, filed on Dec. 12, 2016, which claims priority to Chinese Patent Application No. 201610079780.2, entitled "PAYMENT PROCESSING METHOD AND APPARATUS, AND INTELLIGENT DEVICE" filed with the Chinese Patent Office on Feb. 4, 2016, the entire contents of all of which are incorporated herein by reference.

FIELD OF THE TECHNOLOGY

The present disclosure relates to the field of Internet technologies, specifically, to the field of Internet payment technologies, and in particular, to a payment processing method and apparatus, and an intelligent device.

BACKGROUND OF THE DISCLOSURE

Currently, an application program (application, APP) in an intelligent device may provide e-commerce services. For example, a gaming application program may provide e-commerce services such as virtual items and skills. A user can buy required virtual items and skills when using the gaming application program, and then initiate a payment request to the intelligent device. In current technologies, when receiving a payment request in an interactive entertainment application program, an intelligent device invokes and outputs a payment interface. A user may select a payment manner (such as bank card payment, credit card payment, and third-party platform payment) on the payment interface, and manually input payment account information, to determine to implement payment. Then, the intelligent device forwards the payment request to a corresponding payment platform by using a background server of the interactive entertainment application program to complete payment, and feeds back a payment result. In the foregoing payment processing process, a user needs to manually input the account information on the payment interface by using a peripheral control device of the intelligent device, to implement payment. Such an operation process is relatively complex, the payment efficiency is relatively low, and a payment success rate is easily reduced due to an input error.

SUMMARY

Embodiments of the present disclosure provide a payment processing method and apparatus, and an intelligent device, so as to simplify a payment process and improve the payment efficiency.

The embodiments of the present disclosure provide a payment processing method, applied to an intelligent device. The method may include: intercepting, by the intelligent device, a payment request in a target application program in the intelligent device, the payment request including a payment parameter; obtaining, by the intelligent device, attribute information of the target application program by using a preset executable file; generating, by the intelligent device, a graphic code according to the payment request; outputting, by the intelligent device, the graphic code, so that a terminal device submits the payment parameter to a payment server by scanning the graphic code and reports account information to the payment server, and the payment server performs payment processing according to the payment parameter and the account information and returns a payment result; and feeding back the payment result to the target application program according to the attribute information of the target application program.

The embodiments of the present disclosure further provide a payment processing apparatus, applied to an intelligent device. The apparatus may include a memory and a processor coupled to the memory. The processor is configured to intercept a payment request in a target application program in the intelligent device, the payment request including a payment parameter; obtain attribute information of the target application program by using a preset executable file; generate a graphic code according to the payment request; output the graphic code, so that a terminal device submits the payment parameter to a payment server by scanning the graphic code and reports account information to the payment server, and the payment server performs payment processing according to the payment parameter and the account information and returns a payment result; and to feed back the payment result to the target application program according to the attribute information of the target application program.

The embodiments of the present disclosure further provide an intelligent device. The intelligent device may include the payment processing apparatus described above.

BRIEF DESCRIPTION OF THE DRAWINGS

To describe the technical solutions in the embodiments of the present disclosure or in the existing technology more clearly, the following briefly describes the accompanying drawings required for describing the embodiments or the existing technology. Apparently, the accompanying drawings in the following descriptions show merely some embodiments of the present disclosure, and a person of ordinary skill in the art may still derive other drawings from these accompanying drawings without creative efforts.

DESCRIPTION OF EMBODIMENTS

The following describes the technical solutions in the embodiments of the present disclosure with reference to the accompanying drawings in the embodiments of the present disclosure. Apparently, the described embodiments are merely some but not all of the embodiments of the present disclosure. All other embodiments obtained by a person of ordinary skill in the art based on the embodiments of the present disclosure without creative effects shall fall within the protection scope of the present disclosure.

Figure 1:
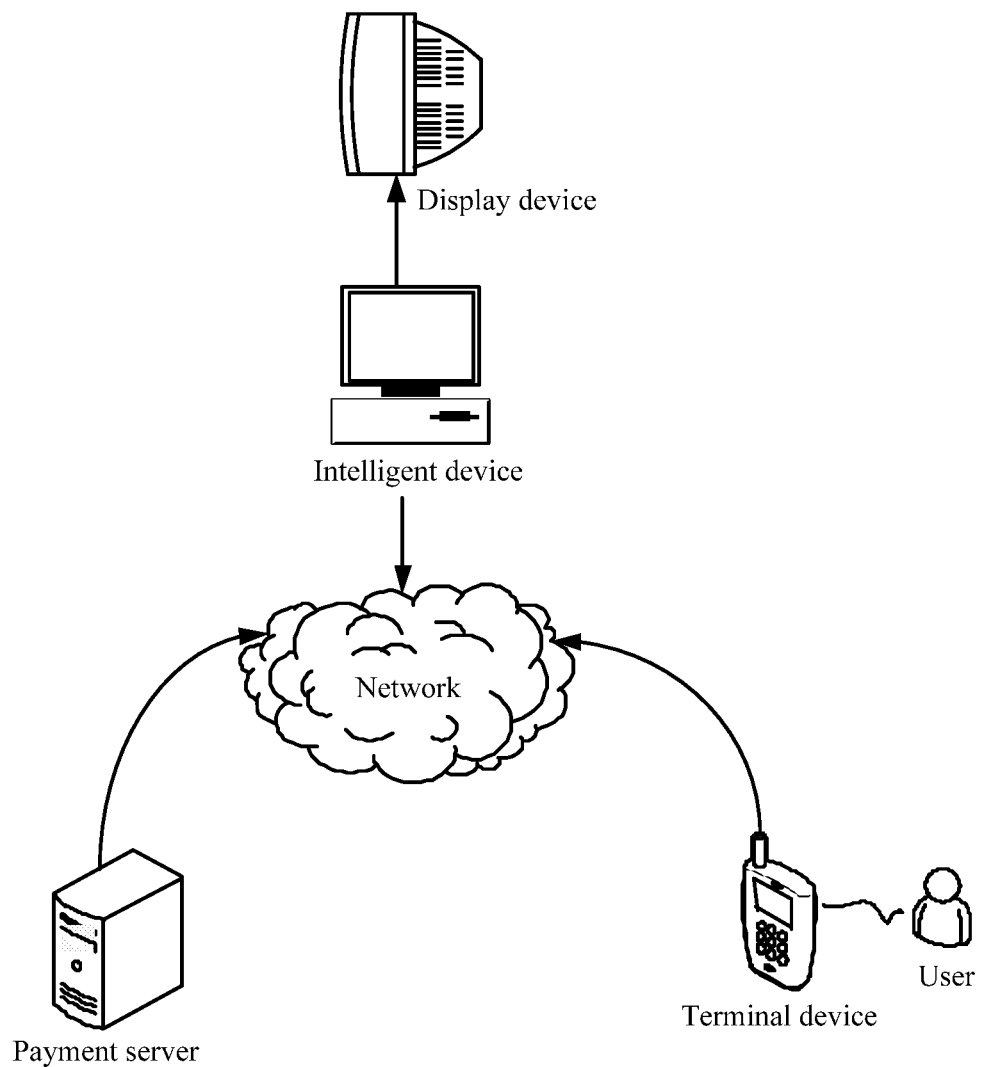
FIG. 1 is a schematic structural diagram of a payment processing system according to an embodiment of the present disclosure.

The embodiments of the present disclosure provide a payment processing system. Referring to FIG. 1, the system may include an intelligent device, a display device, a terminal device, and a payment server. The intelligent device may be connected to the display device in a wired manner such as a cable or a high definition multimedia interface (HDMI). The terminal device may be connected to the intelligent device in a wireless manner such as a general packet radio service (GPRS) technology or wireless fidelity (WiFi). At least one application program may be installed and may run on the terminal device. The application program may include, but not limited to, an instant messaging application program, a social networking service (SNS) application program, a payment application program, and the like. The payment application program is an application program that can provide a payment service function, and may include, but not limited to, a payment APP provided by a financial institution such as a bank, for example, a client of a back or a handy payment APP of a bank; a third-party platform payment APP provided by a third-party financial services institution, for example, an Alipay APP or a Tenpay APP; or a payment program connecting to another application program, for example, a payment plug-in in the instant messaging application program or a payment plug-in in the SNS application program. The payment server is a server corresponding to the payment application program, and is configured to provide specific payment service processing for the payment application program. When a user uses a payment application program in a terminal device to pay for a bought item or a consumed service, the terminal device and a payment device establish a communication connection.

In the embodiments of the present disclosure, the intelligent device refers to an electronic device that can implement interactive entertainment services including Internet games, audio/videos, and the like. The intelligent device has a built-in operating system. The operating system may include, but not limited to, a Windows system (a type of operating system), an Android system (a type of operating system), and the like. At least one interactive entertainment application program may run in the operating system. Herein, the interactive entertainment application program may include, but not limited to, a gaming application program, an audio/video application program, and the like. During actual application, a display device connected to an intelligent device may be a main output device for an interaction interface of an application program in the intelligent device. The display device may include, but not limited to, a digital television, a projector, a PC, a tablet computer (PAD), or other devices. A terminal device connected to the intelligent device is a main peripheral control device for the application program in the intelligent device. The terminal device may include, but not limited to, a notebook computer, a mobile phone, a PAD, an intelligent wearable device, or other devices. Based on this, the intelligent device uses an application program across screens and devices, and can provide highly intelligent and well experienced interactive entertainment services for users.

An interactive entertainment application program in an intelligent device may provide e-commerce services. For example, a gaming application program may provide e-commerce services such as virtual items and skills. A user can buy required virtual items and skills when using the gaming application program, and then initiate a payment request to the intelligent device. In the existing technology, when receiving a payment request in an interactive entertainment application program, an intelligent device jumps to and outputs a payment interface. A user manually selects a payment manner on the payment interface, and manually inputs payment account information. Operations are complex, the payment efficiency is relatively low, and a payment success rate is relatively low. The embodiments of the present disclosure are designed to simplify a payment processing process. Specifically, an intelligent device may intercept a payment request that includes a payment parameter and that is in a target application program in the intelligent device, obtain attribution information of the target application program by using a preset executable file, generate a graphic code according to the payment request, and output the graphic code, so that a terminal device performs payment processing to obtain a payment result by scanning the graphic code and interacting with a payment server, and then feeds back the payment result to the target application program, to complete a payment process in the target application program. Payment processing is performed by scanning a graphic code, greatly simplifying a payment process, avoiding time resource consumption and possible occurrence of an input error that are brought by manually inputting account information, improving the payment processing efficiency, and improving a payment success rate.

Figure 2:
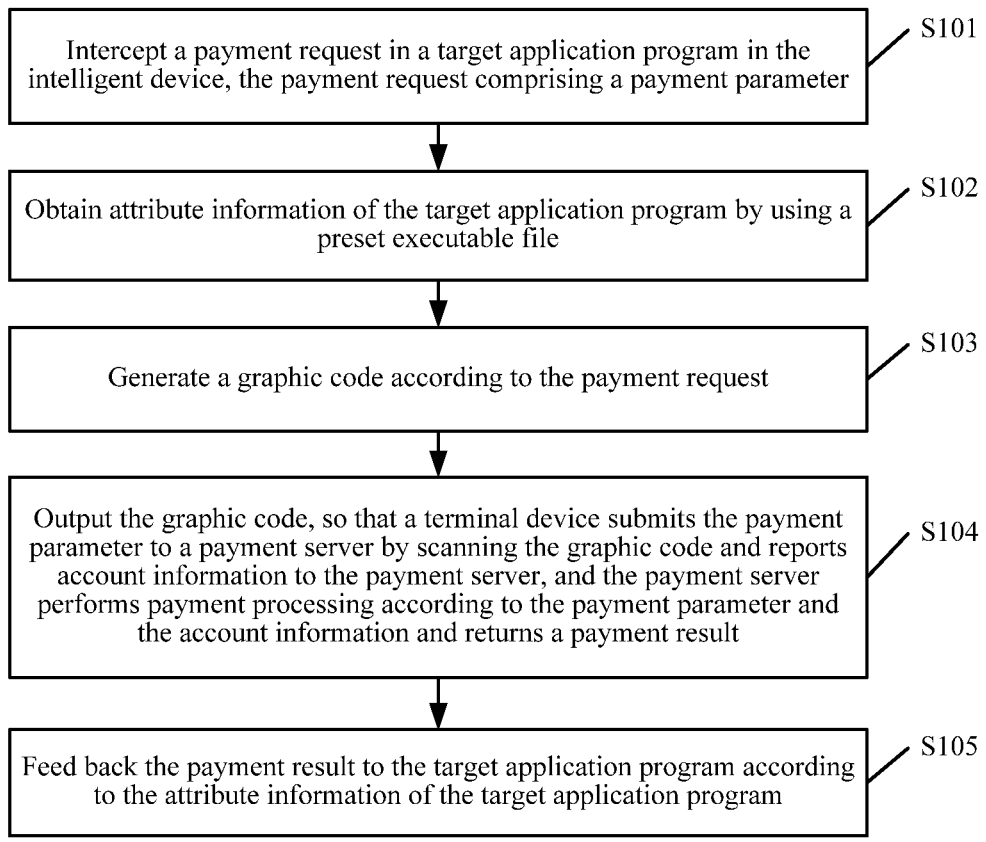
FIG. 2 is a schematic flowchart of a payment processing method according to an embodiment of the present disclosure.

Based on the foregoing descriptions, an embodiment of the present disclosure provides a payment processing method. The method may be applied to the intelligent device shown in FIG. 1. Referring to FIG. 2, the method may include the following steps S101 to S105:

S101: Intercepting a payment request in a target application program in the intelligent device, the payment request including a payment parameter.

In a process of using the target application program in the intelligent device, if an item needs to be bought or a service needs to be consumed, a user may initiate a payment request in the target application program. The intelligent device receives the payment request, and then jumps to and outputs a payment interface. In this step, the intelligent device needs to intercept the payment request to prevent jumping to the payment interface. During specific implementation, when step S101 is performed, the method specifically includes the following steps s11 and s12:

s11: Invoking an operating system component of the intelligent device when a payment request is detected in the target application program in the intelligent device.

s12: Intercepting the payment request by using the operating system component.

In the foregoing steps s11 and s12, the intelligent device may invoke the operating system component (for example, an Activity component at a Framework layer in an Android system) to intercept the payment request. It should be noted that, the operating system component is a component responsible for interacting with the user, and may provide an interface to implement interaction with the user and to control all operations related to the user interaction. After the payment request is intercepted by using the operating system component, the intelligent device does not jump to the payment interface.

S102: Obtaining attribute information of the target application program by using a preset executable file.

The preset executable file is a program file that can be embedded into a process of an operating and that can obtain required information in the embedded hosting process. The preset executable file may be a jar package file. Specifically, a source code may be compiled by using a Java language, the source code having a function of obtaining the attribute information of the target application program from the process; then, the Java source code is encapsulated by using a jar command to form the jar package file. During specific implementation, when step S102 is performed, the method specifically includes the following steps s21 and s22:

s21: Embedding a preset executable file into a process of the target application program.

s22: Obtaining the attribute information of the target application program by using the embedded preset executable file, the attribute information including identification information.

A process is used to describe a running activity of a computer program, and is an entity of the program. When a target application program runs, a process of the target application program is generated in an operating system of the intelligent device. In steps s21 and s22, the preset executable file (a jar package file) may be embedded into the process of the target application program. A Java source code in the jar package file may obtain the attribution information of the target application program. The attribution information may include, but not limited to, the identification information. Herein, the identification information may be application identification (APPID) and/or payment identification (OfferID). One piece of identification information is used for uniquely identify one application program. It can be understood that the preset executable file may be further used for simultaneously obtaining the payment request generated in the target application program. In some embodiments, a payment request from an application program is a mobile-payment type request. The mobile-payment type request is configured to trigger a payment interface on the application program that requires user input of payment information on the intelligent device, such as selecting a payment method and entering payment account details or credit card details. After the payment request is intercepted, the executable file may convert the payment request from a mobile-payment type request to a TV-payment type request. The TV-payment type request is configured to trigger a payment interface with a graphic code, which allows another device to scan the graphic code and continue with the payment. Payment details are not needed to be entered to the intelligence device when responding to the TV-payment type request.

S103: Generating a graphic code according to the payment request.

The graphic code may include, but not limited to, a one-dimensional bar code, a two-dimensional graphic code, and the like. The two-dimensional graphic code may be a quick response (QR) code, a Portable Document Format 417 (PDF417) code, Data Matrix (a type of two-dimensional code), or the like. During specific implementation, when step S103 is performed, the method specifically includes the following steps s31 and s32:

s31: Extracting the payment parameter from the payment request.

s32: Performing encoding processing on the payment parameter by invoking a payment software development kit (SDK), to generate a graphic code.

When the user is using the target application program, if a payment request is initiated because an item needs to be bought or a service needs to be consumed, the payment request carries a payment parameter. The payment parameter may include a payer identifier, a payee identifier, a payment amount, an identifier of a to-be-paid item, and a number of the to-be-paid items. The payer identifier is an ID of a user buying an item or consuming a service in the target application program. The payee identifier is an ID of an item provider or a service provider in the target application program. The payment amount is a total amount that a payer needs to be paid for a bought item or a consumed service. The identifier of the to-be-paid item is an identifier of an item or a service to be bought in the target application program. In step s31, the intelligent device parses the received payment request according to a message format of the payment request, so as to obtain the payment parameter. In a feasible implementation of the present disclosure, the intelligent device may prestore at least one payment SDK. For example, a payment SDK provided by a third-party platform (for example, Alipay) is prestored. In this case, the intelligent device supports use of a third-party platform payment application program in the terminal device to complete payment. For another example, a payment SDK provided by an instant messaging application program is prestored. In this case, the intelligent device supports use of a payment plug-in of an instant messaging application program in the terminal device to complete payment. In another feasible implementation of the present disclosure, the intelligent device may prestore a payment component. The payment component provides a mixed SDK (MSDK). The MSDK integrates at least one payment SDK provided by a financial institution such as a bank, a third-party financial services institution, and other application program developers. In this case, the intelligent device supports use of a client of a bank APP, a third-party platform payment APP, a payment plug-in of another application program, and the like to complete payment. In step s32, the intelligent device may perform encoding processing on the payment parameter by invoking a payment SDK prestored by the intelligent device, to generate the graphic code.

S104: Outputting the graphic code, so that a terminal device submits the payment parameter to a payment server by scanning the graphic code and reports account information to the payment server, and the payment server performs payment processing according to the payment parameter and the account information and returns a payment result.

In step S104, the intelligent device may output the graphic code by using a display device connected to the intelligent device, so that the terminal device scans the graphic code to complete payment, thereby improving the convenience and the payment efficiency. During specific implementation, when step S104 is performed, the method specifically includes the following steps s41 and s42:

s41: Establishing a communication connection to a display device, the display device including any one of a digital television, a projector, a PC, and a tablet computer.

s42: Transferring the graphic code to the display device for displaying, so that the terminal device obtains the payment parameter by scanning the graphic code displayed on the display device. The terminal device obtains payment account information, and sends the account information and the payment parameter to the payment server, and the payment server performs payment processing on the account information according to the payment parameter and returns a payment result.

In steps s41 and s42, the terminal device obtains the payment parameter by scanning the graphic code displayed on the display device. In addition, the terminal device outputs a payment prompt on its screen, the payment prompt including content of the payment parameter. When the user determines to perform payment, the terminal device obtains payment account information. The account information herein may include bank card information, credit card information, third-party electronic account information, and a corresponding payment password. In this case, the terminal device sends both the payment parameter and the account information to the payment server. The payment server authenticates the account information, and if the authentication succeeds, performs payment processing on the account information according to the payment parameter, to obtain the payment result. It can be understood that the payment processing process herein may include: removing money corresponding to an amount from an electronic account indicated by the account information, and transferring money corresponding to the amount to an associated account corresponding to the payee identifier. The payment result herein includes a payment success or a payment failure. The payment server returns the payment result to the intelligent device.

S105: Feeding back the payment result to the target application program according to the attribute information of the target application program.

During specific implementation, when step S105 is performed, the method specifically includes the following steps s51 and s52:

s51: Invoking a callback function according to the attribute information of the target application program.

s52: Transferring the payment result to the target application program by using the callback function.

In embodiments of the present disclosure, after obtaining the attribute information of the target application program and the payment request (e.g., in step s22), the preset executable file (the jar package file) instantiates those to form a payment object instance. The preset executable file (the jar package file) and the target application program may establish a communication connection and mutually transmit data with each other. In steps s51 and s52, the intelligent device invokes a callback function, and transfers the payment result to the preset executable file (the jar package file) of the process in the target application program, and then the preset executable file (the jar package file) transfers the payment result to the target application program, to complete a payment process in the target application program.

In some embodiments, a server may facilitate processing the payment request. The server may execute in a nodejs environment. The graphic code may include a first universal unique identification (UUID) corresponding to the application program. When the terminal device scans the graphic code and obtains the first UUID, the server may establish a first long connection with the terminal device based on the first UUID. The server further establishes a second long connection with the intelligent device based on a second UUID corresponding to a user account logged in to the application program. The long connections can be used to query and synchronize information related to the payment based on the corresponding UUIDs. The intelligent device may report the first UUID, the second UUID, and order information to a common gateway interface (CGI) of order processing associated with the server. The first UUID and the second UUID may be combined and converted to a request string, which is encrypted and sent to the CGI. The server may update payment status to "submitting the order" to the intelligent device through the second long connection. The intelligent device can update the display interface to reflect the payment status as "submitting the order." Further, the server may, based on the first UUID received from the intelligent device, find the terminal device that established the long connection corresponding to the first UUID, and send the order information to the terminal device. The terminal device may parse the order information, obtain the second UUID and use it as a payment parameter. The user may initiate the payment on the terminal device. The server may update the payment status as "payment initiated" through the first long connection from the terminal device. The intelligent device may also be notified of the payment initiation through the second long connection with the server, and update the display interface to reflect the payment status as "payment initiated." When the payment is completed on the terminal device, the server returns the payment result to the intelligent device. The intelligent device update the display interface to reflect the payment status as "payment completed."

According to the payment processing method in embodiments of the present disclosure, a payment request that includes a payment parameter and that is in a target application program in the intelligent device may be intercepted, attribution information of the target application program may be obtained by using a preset executable file, a graphic code may be generated according to the payment request, and the graphic code may be output, so that a terminal device performs payment processing to obtain a payment result by scanning the graphic code and interacting with a payment server, and then feeds back the payment result to the target application program, to complete a payment process in the target application program. Payment processing is performed by scanning a graphic code, greatly simplifying a payment process, avoiding time resource consumption and possible occurrence of an input error that are brought by manually inputting account information, improving the payment processing efficiency, and improving a payment success rate.

Figure 3:
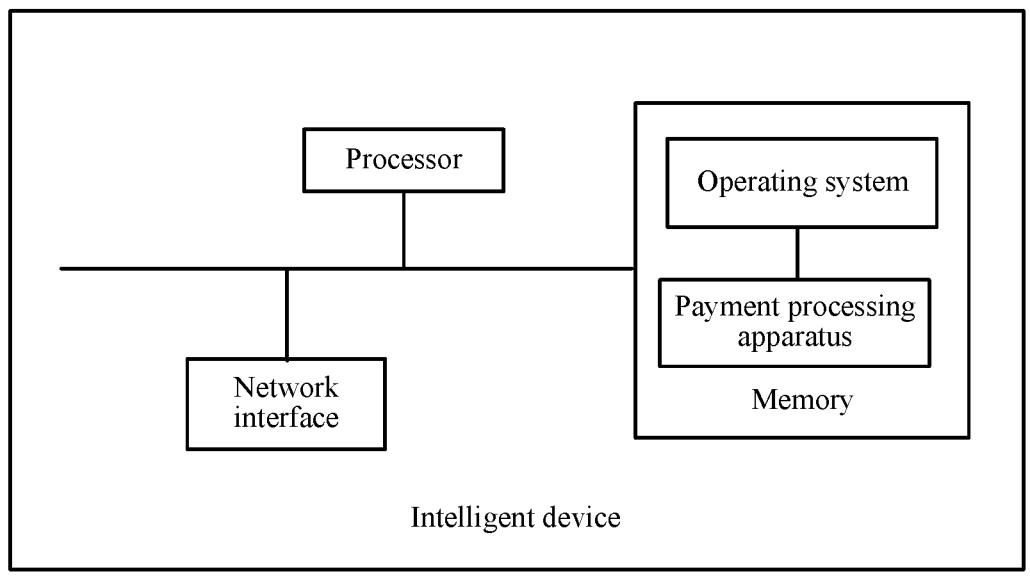
FIG. 3 is a schematic structural diagram of an intelligent device according to an embodiment of the present disclosure.

An embodiment of the present disclosure provides an intelligent device. Referring to FIG. 3, an internal structure of the intelligent device may include, but not limited to, a processor, a network interface, and a memory. The processor, the network interface, and the memory of the intelligent device may be connected by using a bus or in another manner. In FIG. 3, a bus connection is used as an example for description.

The processor (or referred to as a central processing unit (CPU)) is a computing core and control core of the intelligent device. The processor can parse various instructions in the intelligent device and process various data of the intelligent device. The memory is a memory device of the intelligent device, is configured to store a program and data, and may include, but not limited to, a ROM, a RAM, a CD-ROM, another removable memory, and the like. It can be understood that the memory herein may include an internal memory of the intelligent device, or may certainly include an extended memory supported by the intelligent device. The memory provides storage space. The storage space stores an operating system of the intelligent device, and may further store a program code, a functional module, and the like. The operating system may include, but not limited to, a Windows system, an Android system, and the like. In embodiments of the present disclosure, a payment processing apparatus is further stored in the storage space of the memory. The intelligent device performs the corresponding steps in the method process shown in FIG. 1 by running the payment processing apparatus in the memory.

Figure 4:
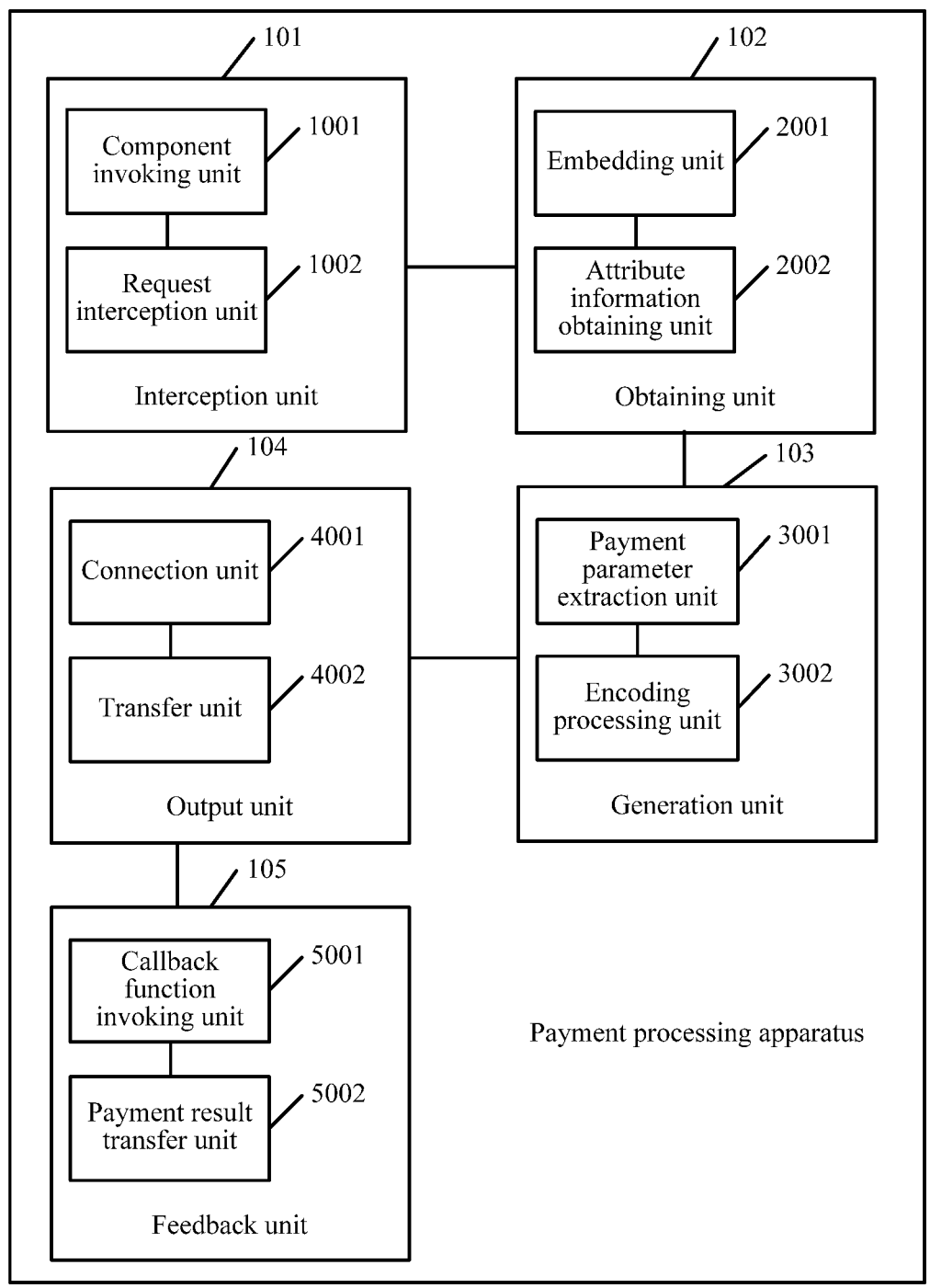
FIG. 4 is a schematic structural diagram of a payment processing apparatus according to an embodiment of the present disclosure.

Referring to FIG. 4, the payment processing apparatus runs the following units:

an interception unit 101, configured to intercept a payment request in a target application program in the intelligent device, the payment request including a payment parameter;

an obtaining unit 102, configured to obtain attribute information of the target application program by using a preset executable file;

a generation unit 103, configured to generate a graphic code according to the payment request;

an output unit 104, configured to output the graphic code, so that a terminal device submits the payment parameter to a payment server by scanning the graphic code and reports account information to the payment server, and the payment server performs payment processing according to the payment parameter and the account information and returns a payment result; and a feedback unit 105, configured to feed back the payment result to the target application program according to the attribute information of the target application program.

During specific implementation, in a process of running the interception unit 101 by the apparatus, the apparatus specifically runs the following units:

a component invoking unit 1001, configured to invoke an operating system component of the intelligent device when a payment request is detected in the target application program in the intelligent device; and a request interception unit 1002, configured to intercept the payment request by using the operating system component.

During specific implementation, in a process of running the obtaining unit 102 by the apparatus, the apparatus specifically runs the following units:

an embedding unit 2001, configured to embed a preset executable file into a process of the target application program; and an attribute information obtaining unit 2002, configured to obtain the attribute information of the target application program by using the embedded preset executable file, the attribute information including identification information.

During specific implementation, in a process of running the generation unit 103 by the apparatus, the apparatus specifically runs the following units:

a payment parameter extraction unit 3001, configured to extract the payment parameter from the payment request, the payment parameter including a payer identifier, a payee identifier, a payment amount, an identifier of a to-be-paid item, and a number of to-be-paid items; and an encoding processing unit 3002, configured to perform encoding processing on the payment parameter by invoking a payment software development kit, to generate a graphic code, the graphic code including a one-dimensional bar code or a two-dimensional graphic code.

During specific implementation, in a process of running the output unit 104 by the apparatus, the apparatus specifically runs the following units:

a connection unit 4001, configured to establish a communication connection to a display device, the display device including any one of a digital television, a projector, a PC, and a tablet computer; and a transfer unit 4002, configured to transfer the graphic code to the display device for displaying, so that the terminal device can obtain the payment parameter by scanning the graphic code displayed on the display device, obtain payment account information, and send the account information and the payment parameter to the payment server, and the payment server performs payment processing on the account information according to the payment parameter and returns a payment result.

During specific implementation, in a process of running the feedback unit 105 by the apparatus, the apparatus specifically runs the following units:

a callback function invoking unit 5001, configured to invoke a callback function according to the attribute information of the target application program; and a payment result transfer unit 5002, configured to transfer the payment result to the target application program by using the callback function.

Similar to the method, according to the intelligent device and the payment processing apparatus built in the intelligent device in embodiments of the present disclosure, a payment request that includes a payment parameter and that is in a target application program in the intelligent device may be intercepted, attribution information of the target application program may be obtained by using a preset executable file, a graphic code may be generated according to the payment request, and the graphic code may be output, so that a terminal device performs payment processing to obtain a payment result by scanning the graphic code and interacting with a payment server, and then feeds back the payment result to the target application program, to complete a payment process in the target application program. Payment processing is performed by scanning a graphic code, greatly simplifying a payment process, avoiding time resource consumption and possible occurrence of an input error that are brought by manually inputting account information, improving the payment processing efficiency, and improving a payment success rate.

According to the embodiments of the present disclosure, a payment request that includes a payment parameter and that is in a target application program in the intelligent device may be intercepted, attribution information of the target application program may be obtained by using a preset executable file, a graphic code may be generated according to the payment request, and the graphic code may be output, so that a terminal device performs payment processing to obtain a payment result by scanning the graphic code and interacting with a payment server, and then feeds back the payment result to the target application program, to complete a payment process in the target application program. Payment processing is performed by scanning a graphic code, greatly simplifying a payment process, avoiding time resource consumption and possible occurrence of an input error that are brought by manually inputting account information, improving the payment efficiency, and improving a payment success rate.

A person of ordinary skill in the art may understand that all or some of the processes of the method in the foregoing embodiment may be implemented by a computer program instructing relevant hardware. The program may be stored in a computer readable storage medium. When the program is run by a data processing device, processes including the embodiment of the method may be performed. For details, refer to the descriptions of the embodiments with reference to the accompanying drawings. The foregoing storage medium may include: a magnetic disk, an optical disc, a read-only memory (ROM), or a random access memory (RAM).

In addition, the computer readable storage medium may further be various recording media that can be accessed by a computer apparatus by using a network or a communications link, for example, a recording medium within which data can be extracted by using a router, the Internet, a local area network, or the like. Moreover, the computer readable storage medium may be a plurality of computer readable storage media located in a same computer system, or may be computer readable storage media distributed in a plurality of computer systems or computing apparatuses.

The foregoing descriptions are merely preferred embodiments of the present disclosure, but are not intended to limit the present disclosure. Therefore, equivalent changes made according to the claims of the present disclosure still fall within the scope of the present disclosure.

What is claimed is:

1. A payment processing method, comprising:
running, by an intelligent device with audio and video output, a target application program;

while the target application program is being run, receiving, by the intelligent device a payment request operation inputted by a user, the payment request operation being to purchase an item associated with the target application program;
upon receiving the payment request operation, invoking, by the intelligent device, an operating system component of the intelligent device;
intercepting, by the intelligent device, the payment request operation in the target application program by invoking the operating system component;
obtaining, by the intelligent device, attribute information of the target application program by using a preset executable file;
converting, by the intelligent device, the payment request operation to a scannable code, by:
extracting a payment parameter from the payment request operation; and
performing encoding processing on the payment parameter by invoking a payment software development kit (SDK), to generate the scannable code;
outputting, by the intelligent device, the scannable code to an electronic display device in data communication with the intelligent device;
displaying, on a screen of the electronic display device, the scannable code;
receiving, by an electronic terminal device, a payment interface via a scan of the scannable code by the electronic terminal device;
submitting, by the electronic terminal device, account information to a payment server via the payment interface;
performing, by the payment server, payment processing according to the account information;
returning, by the payment server, a payment result to the electronic display device;
feeding back, by the electronic display device, the payment result to the intelligent device while the target application program is still being run; and
providing, by the intelligent device, the item to the user to enable use of the item in user's interaction with the target application program.

2. The method according to claim 1, wherein obtaining, by the intelligent device, attribute information of the target application program by using the preset executable file includes:
embedding the preset executable file into a process of the target application program; and
obtaining the attribute information of the target application program by using the embedded preset executable file, the attribute information including identification information.

3. The method according to claim 1, wherein
the payment parameter includes one or more of a payer identifier, a payee identifier, a payment amount, an identifier of a to-be-paid item, and a quantity of the to-be-paid item; and
the scannable code includes a one-dimensional bar code or a two-dimensional graphic code.

4. The method according to claim 1, wherein the electronic display device includes any one of a digital television, a projector, a personal computer (PC), and a tablet computer.

5. The method according to claim 1, wherein feeding back the payment result to the intelligent device includes:
invoking a callback function according to the attribute information of the target application program; and
transferring the payment result to the target application program by using the callback function.

6. The method according to claim 1, wherein the operating system component implements interaction with the user, controls operations related to the interaction with the user, avoids display of the payment interface at the intelligent device, and facilitates display of the payment interface at the electronic terminal device.

7. The method according to claim 1, wherein invoking the payment SDK comprises:
providing, by the payment server, the payment SDK.

8. The method according to claim 1, wherein a payment application program runs on the electronic terminal device, and wherein performing the payment processing comprises:
performing, by the payment server, the payment service processing for the payment application program running on the electronic terminal device.

9. A payment processing apparatus, applied to an intelligent device, the apparatus comprising: a memory; and a processor coupled to the memory and configured to:
run, by the intelligent device with audio and video output, a target application program;
while the target application program is being run, receive, by the intelligent device a payment request operation inputted by a user, the payment request operation being to purchase an item associated with the target application program;
upon receipt of the payment request operation, invoke, by the intelligent device, an operating system component of the intelligent device;
intercept the payment request in the target application program in the intelligent device;
obtain attribute information of the target application program by using a preset executable file;
convert, by the intelligent device, the payment request operation to a scannable code, by:
extracting a payment parameter from the payment request operation; and
performing encoding processing on the payment parameter by invoking a payment software development kit (SDK), to generate the scannable code;
output, by the intelligent device, the scannable code to an electronic display device in data communication with the intelligent device;
display, on a screen of the electronic display device, the scannable code;
receive, by an electronic terminal device, a payment interface via a scan of the scannable code by the electronic terminal device;
submit, by the electronic terminal device, account information to a payment server via the payment interface;
perform, by the payment server, payment processing according to the account information;
return, by the payment server, a payment result to the intelligent device;
feedback, by the electronic display device, the payment result to the intelligent device while the target application program is still being run; and
provide, by the intelligent device, the item to the user to enable use of the item in user's interaction with the target application program.

10. The apparatus according to claim 9, wherein the processor is further configured to:
embed the preset executable file into a process of the target application program; and obtain the attribute information of the target application program by using the embedded preset executable file, the attribute information including identification information.

11. The apparatus according to claim 9, wherein
the payment parameter includes one or more of a payer identifier, a payee identifier, a payment amount, an identifier of a to-be-paid item, and a number of the to-be-paid item; and
the scannable code includes a one-dimensional bar code or a two-dimensional graphic code.

12. The apparatus according to claim 9, wherein the electronic display device including any one of a digital television, a projector, a personal computer (PC), and a tablet computer.

13. The apparatus according to claim 9, wherein the processor is further configured to:
invoke a callback function according to the attribute information of the target application program; and
transfer the payment result to the target application program by using the callback function.

14. A non-transitory computer readable storage medium, configured to store a computer readable instruction, and the computer executable instruction, when being executed by a data processor, causing the data processor to perform:
running, by an intelligent device with audio and video output, a target application program;
while the target application program is being run, receiving, by the intelligent device a payment request operation inputted by a user, the payment request operation being to purchase an item associated with the target application program;
upon receiving the payment request operation, involving, by the intelligent device, an operating system component of the intelligent device;
intercepting the payment request in the target application program in the intelligent device;
obtaining attribute information of the target application program by using a preset executable file;
converting, by the intelligent device, the payment request operation to a scannable code, by:
  extracting a payment parameter from the payment request operation; and
  performing encoding processing on the payment parameter by invoking a payment software development kit (SDK), to generate the scannable code;
outputting, by the intelligent device, the scannable code to an electronic display device in data communication with the intelligent device;
display, on a screen of the electronic display device, the scannable code;
receiving, by an electronic terminal device, a payment interface via a scan of the scannable code by the electronic terminal device;
submitting, by the electronic terminal device, account information to a payment server via the payment interface;
performing, by the payment server, payment processing according to the account information;
returning, by the payment server, a payment result to the electronic display device;
feeding back, by the electronic display device, the payment result to the intelligent device while the target application program is still being run; and
providing, by the intelligent device, the item to the user to enable use of the item in user's interaction with the target application program.

15. The computer readable storage medium according to claim 14, wherein obtaining attribute information of the target application program by using the preset executable file includes:
embedding the preset executable file into a process of the target application program; and
obtaining the attribute information of the target application program by using the embedded preset executable file, the attribute information including identification information.

16. The computer readable storage medium according to claim 14, wherein
the payment parameter includes one or more of a payer identifier, a payee identifier, a payment amount, an identifier of a to-be-paid item, and a quantity of the to-be-paid item; and
the scannable code includes a one-dimensional bar code or a two-dimensional graphic code.

17. The computer readable storage medium according to claim 14, wherein the electronic display device includes any one of a digital television, a projector, a personal computer (PC), and a tablet computer.

18. The computer readable storage medium according to claim 14, wherein feeding back the payment result to the intelligent device includes:
invoking a callback function according to the attribute information of the target application program; and
transferring the payment result to the target application program by using the callback function.

* * * * *